May 16, 1939. C. C. NUTTER 2,158,551
APPARATUS FOR SEPARATING PRECIOUS METALS FROM BLACK SAND
Filed Sept. 18, 1937
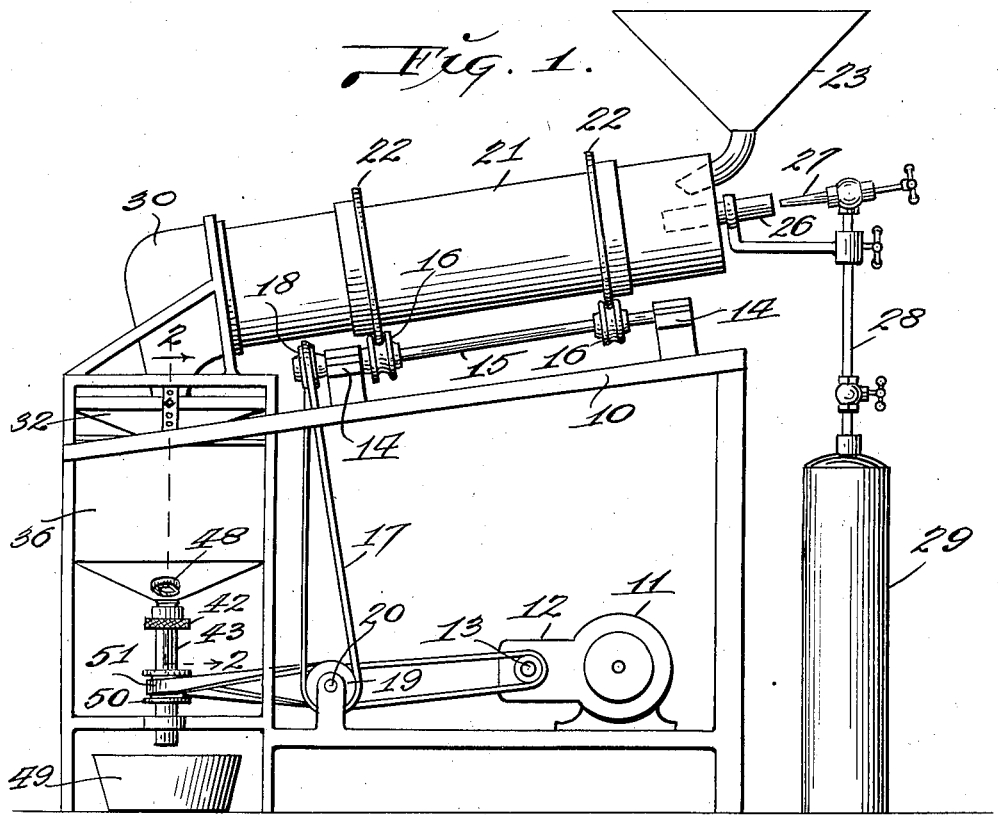
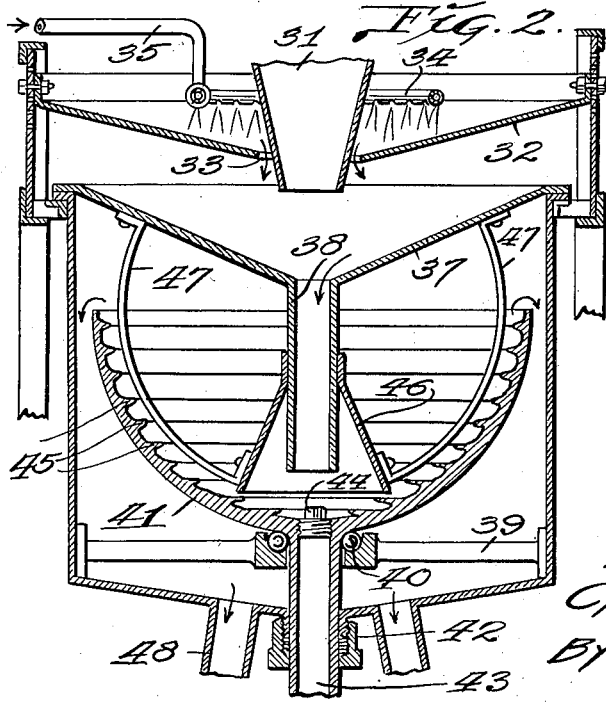
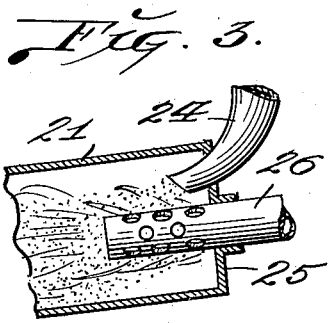
INVENTOR,
CHARLES C. NUTTER
By Martin P. Smith
ATTY.

Patented May 16, 1939

2,158,551

UNITED STATES PATENT OFFICE 2,158,551

APPARATUS FOR SEPARATING PRECIOUS METALS FROM BLACK SAND

Charles C. Nutter, West Los Angeles, Calif.

Application September 18, 1937, Serial No. 164,537

1 Claim. (Cl. 209—11)

My invention relates generally to the recovery of precious metals, and more particularly to a method of and apparatus for recovering metals such as gold, platinum and the like, from black sand that is found in various parts of the world, and particularly along the west coast of the United States.

So-called black sand is generally as fine or finer than ocean sand, and the precious metals contained in such sand are more or less microscopic, consequently it is a difficult matter to treat such sand and obtain a high percentage of recovery of precious metals, and it is the purpose of my invention to provide a relatively simple and easily practiced method whereby the grains of sand bearing precious metals are broken into a number of pieces to free the microscopic metals and the latter being recovered through the use of mercury.

My improved method involves the mixing of a suitable flux with the sand and subjecting the metal to a heat somewhat less than the heat required to melt the gold, plantinum or the like, and then cooling the heated sand and its flux, which cooling effect may be attained by discharging the sand and flux into water and as a result of the sudden lowering of the temperature, the grains of sand will explode and burst into several pieces, thus liberating the metals contained within the sand and which metals are finally recovered by being amalgamated with mercury.

A further object of my invention is to provide a relatively simple, inexpensive and efficient apparatus, that is especially designed for economically practicing my improved method.

With the foregoing and other objects in view, my invention consists in certain novel features of construction and arrangements of parts that will be hereinafter more fully described and claimed, and illustrated in the accompanying drawing in which:

Fig. 1 is a side elevational view of an apparatus particularly adapted for the separation of precious metals from black sand in accordance with my improved method.

Fig. 2 is an enlarged vertical section taken approximately on the line 2—2 of Fig. 1.

Fig. 3 is a vertical section taken through the end of the retort into which the sand is delivered to be heated.

Referring by numerals to the accompanying drawing which illustrates a practical embodiment of the apparatus utilized for practicing my improved method, 10 designates a frame, preferably formed of metal, in the lower portion of which is arranged for operation a motor 11, either electric as illustrated, or an internal combustion engine. Associated with the motor is a conventional reduction gear contained within a housing 12, and said reduction gear driving a shaft 13.

Mounted for rotation in bearing 14 on top of the frame 10 are inclined shafts such as 15, each shaft carrying a pair of grooved wheels 16. One of these shafts is driven by suitable connections, for instance a belt or sprocket wheel 17, that operates on pulleys or sprocket wheels 18 and 19, the latter being mounted on a countershaft 20 that is arranged for operation in the lower portion of frame 10 and which is suitably driven by a belt or chain from shaft 13.

Mounted for rotation on the grooved wheels 16 is an inclined drum or cylinder 21, the same carrying a pair of circumferential ribs 22 that bear on the grooved wheels 16.

Suitably supported above the rear end of this drum is a hopper 23 that receives the sand to be treated, and leading from the lower end of this hopper downwardly into the rear end of drum 21 is a spout 24. The rear end of drum 21 is closed by a head or plate 25 and passing through the center thereof is a burner tube 26.

A valved jet nozzle 27 is carried by the upper end of a tube 28 that leads from a gas tank 29 and said nozzle when open, discharges a jet of gas into and through the burner tube 26, and when this gas is ignited, the resulting flame is projected forwardly through the rotating cylinder 21.

The forward lower end of cylinder 21 extends into a shell or housing 30 having a depending discharge nozzle 31 that gradually tapers toward its lower end.

Mounted for vertical adjustment in the forward upward portion of frame 10 and surrounding nozzle 31 is a shallow pan 32 that gradually declines in all directions toward its center and formed in the center of this pan, is an opening 33 that is slightly larger in diameter than the lower end of the nozzle 31. By adjusting the pan 32 vertically, the effective size of the opening 33 may be increased or diminished, thus controlling the volume flow of water through said opening.

Positioned above the pan 32 and surrounding nozzle 31 is a pipe 34 provided in its lower portion with jet openings to permit discharge of water downwardly onto the pan and around the nozzle 31, and leading to this pipe 34 is a supply pipe 35.

Supported within the frame 10 directly below the pan 32 is a housing 36 and removably positioned on the top thereof is a hopper 37.

Leading downwardly from the center of hopper 37 is a tube 38.

Arranged in the bottom of the housing 36 is a skeleton frame or spider 39 provided with a centrally arranged anti-friction bearing 40 for a bowl 41, and depending from the center of said bowl through the bearing 40 and through a stuffing box 42 in the bottom of housing 36 is a vertically disposed tube 43 through which the metals and the mercury carrying the same discharge from the bowl.

Screw-seated in the upper end of the discharge pipe 43 is a plug 44 that may be manipulated by a socket wrench located on the end of a tube, and which may be inserted downwardly through the tube 38.

Formed integral with the inner face of bowl 41 is a series of horizontally disposed annular ribs or riffles 45 which, as the bowl is rotated, tend to oppose the travel of sand upwardly over the inner surface of the bowl as the result of centrifugal force developed by the rotation of the bowl and such action tends to separate the relatively heavy particles of metal from the sand.

Mounted on the depending tube 38 is a hollow conical member 46, the lower edge of which normally occupies a position just above one of the ribs or riffles in the bottom of bowl 41 and secured to the lower portion of this conical member are the lower ends of outwardly and upwardly projecting baffle bars 47, the upper ends of which are secured to the underside of hopper 37. These baffle bars tend to scrape the sand from the riffles as it passes upwardly thereover, thus accelerating the separation of the particles of metal from the sand.

Depending from the bottom of the housing 36 are outlet pipes 48 through which the sand and water discharge after having discharged over the upper edge of the bowl 41 into the lower portion of the housing.

Positioned beneath the lower end of the depending tube 43 is a container 49 that receives the metal and the mercury with which said metal is amalgamated.

Mounted on the discharge tube 43 below the housing 36 is a pulley 50 or sprocket wheel, upon which operates a belt or sprocket chain 51 that passes over a pulley or sprocket wheel carried by shaft 20.

In practicing my improved method with the apparatus just described, the metal-bearing sand mixed with a suitable flux, discharges from hopper 23 through spout 24 into the elevated rear end of cylinder 21, and which latter is rotated at the proper speed from the motor 11.

The jet of gas issuing from nozzle 26 is ignited as it passes through the burner tube 26, and the resulting flames pass lengthwise through the drum or cylinder, thus rapidly heating the sand that also pass through said drum or cylinder, due to its inclination and the rotation thereof.

The degree of heat applied to the sand varies in accordance with the individual characteristics and size of the sand that is being treated, but in no event should the heat be such as to fuse the sand or to melt the precious metals contained therein.

While the apparatus is in operation, water flows continually through the opening 33 in pan 32, which opening surrounds the discharge end of spout 33, and as a result of its contact with this surrounding wall of water, the temperature of the sand is quickly lowered, thus bringing about a rapid contraction in the grains of sand so that the same burst and fly in pieces, thus liberating the microscopic metal contained in the sand, and the particles of sand and metal are washed downwardly through hopper 37 and tube 38 into the bottom of bowl 41, which is rotated at the proper speed from the counter shaft 20.

As a result of the rotation of the bowl, the sand being of lighter weight than the metal will, as a result of centrifugal force, travel upwardly over the ribs or riffles on the inner face of the bowl, and finally this sand will discharge over the upper edge of the bowl, together with the overflow of water and this sand and water will discharge through the waste or outlet pipes 48.

During this upward travel of the sand within the bowl, the metals being heavier than the sand will gradually gravitate to the bottom of the bowl and amalgamate with mercury that is placed in the bowl, and after a certain amount of sand has been run through the machine, the plug 44 is unscrewed from the upper end of tube 43 to permit the mercury and metals carried thereby to discharge through tube 42 into receptacle 49.

As the apparatus is started, and water and sand are delivered into the bowl, air will be trapped in the upper portion of the conical shell 46, and such air functions as a cushion for the material directly beneath the shell and which air cushion tends to bring about a more rapid and thorough separation of the particles of sand from the metal.

The use of flux with the sand delivered to the drum depends on the nature of the sand and the kind or kinds of precious metals carried thereby. The flux is used to aid in the bursting or breaking up of the grains of sand, and while certain kinds of sand require a relatively large proportion of flux, other sands require very little if any flux.

In the event that the heating of the sand or other pulverized ore liberates metallic gases, the same will be condensed by the water surrounding the discharge end of nozzle 31 and carried downward with the broken sand and water into and through hopper 37 and finally into the bottom of the bowl 41.

Thus it will be seen that I have provided a relatively simple and easily practiced method for separating metal from black sand and the like, and that I have also provided a relatively simple, inexpensive and efficient apparatus for practicing my improved method. Obviously, the construction of the apparatus may be varied in minor detail without departing from the spirit of my invention, the scope of which is set forth in the appended claim.

I claim as my invention:

In an apparatus for recovering precious metals from sand, a drum for rotation on an inclined axis, means for rotating said drum, a burner tube projecting axially into the elevated end of said drum, that portion of the burner tube within the drum being perforated and a sand delivery spout extending into the elevated end of said drum with the discharge end of said spout disposed directly above the perforated portion of said burner tube.

CHARLES C. NUTTER.